United States Patent Office 3,047,558
Patented July 31, 1962

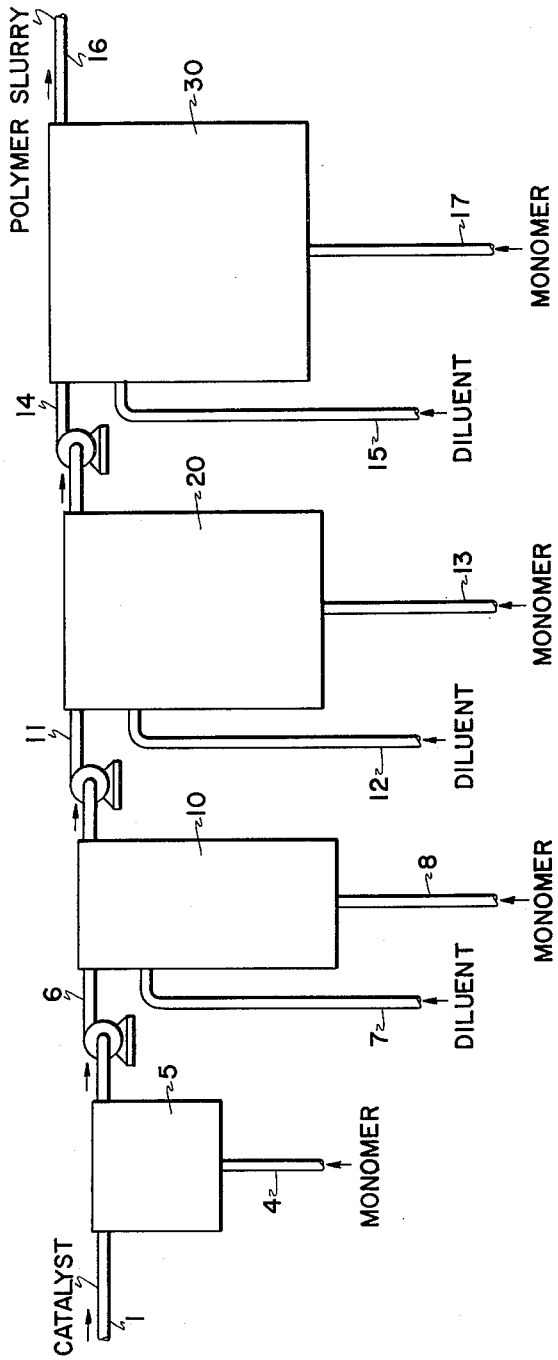

3,047,558
PRESSURE STAGED POLYMERIZATION
PROCESS
Arthur W. Langer, Jr., Watchung, and Erik Tornqvist,
Westfield, N.J., assignors to Esso Research and Engineering Company, a corporation of Delaware
Filed May 15, 1959, Ser. No. 813,419
5 Claims. (Cl. 260—93.7)

This invention relates to an improved method of obtaining improved product crystallinity and catalyst activity in the low pressure polymerization of hydrocarbon monomers. More particularly, it relates to a process of this nature utilizing a staged operation with increasing monomer partial pressure as the polymerization proceeds.

The low pressure polymerization and copolymerization of alpha olefins and diolefins with catalyst systems made up of a partially reduced, heavy, transition metal compound and a reducing metal-containing compound to high density, often isotactic, high molecular weight, solid, relatively linear products has been assuming ever increasing importance and is now well known. Some of the problems in the process arise in reconciling high product crystallinities and catalyst activities. Thus, high monomer concentrations which yield good catalyst activity, result in low product crystallinity. Low monomer concentrations give the opposite result.

This invention provides an improved method of overcoming these problems. The method comprises conducting the polymerization in a staged operation while increasing the monomer partial pressure as the polymerization proceeds.

The olefins particularly suited for this type of operation are $C_3$ to $C_5$ alpha olefins such as propylene, butene-1 and pentene-1, although other olefins can be utilized.

The low pressure polymerization process generally is described in the literature, e.g. Belgian Patent 538,782 and "Scientific American," September 1957, pages 98 et seq.

In that process the polymers are prepared by polymerizing the constituent monomers in the desired proportions with the aid of certain polymerization catalysts, e.g. see above-mentioned Belgian patent. The catalysts are solid, insoluble reaction products obtained by partially reducing a heavy metal compound of groups IV–B, V–B and VI–B of the periodic system such as vanadium tetrachloride or a titanium halide, e.g. $TiCl_4$, $TiBr_4$, etc., preferably with metallic aluminum. The preferred catalyst of this type is usually prepared by reducing 1 mole of titanium tetrahalide, usually tetrachloride, with about one-third atom of aluminum to give a material corresponding to $TiCl_3 \cdot 0.33 AlCl_3$, thus containing cocrystallized $AlCl_3$. (For further details see copending U.S. application Serial No. 578,198, filed April 6, 1956, and Serial No. 766,376, filed October 19, 1958.) The product is then activated with an aluminum alkyl compound corresponding to the formula $RR'AlX$. In this formula R, R' and X preferably are alkyl groups of 2 to 8 carbon atoms, although X may alternatively be hydrogen or a halogen, notably chlorine. Typical examples of the aluminum alkyl compounds are aluminum triethyl, diethyl aluminum chlorides, aluminum triisobutyl, etc.

The monomers are then contacted with the resulting catalyst in the presence of inert hydrocarbon solvents such as isopentane, n-heptane, benzene, xylene, etc. The polymerization is conveniently effected at temperatures of about 0° to 100° C. and pressures ranging from about 15 to 200 p.s.i. The catalyst concentration in the polymerization zone is preferably in the range of about 0.01 to 0.5 wt. percent based on total liquid, and the polymer product concentration in the polymerization zone is preferably kept between about 2 to 20% based on total contents so as to allow easy handling of the polymerized mixture. The desired proper polymer concentration can be obtained by properly controlling monomer feed and/or catalyst concentration. When the desired degree of polymerization has been reached, a $C_1$ to $C_8$ alkanol such as methyl alcohol or isopropyl alcohol plus a chelating agent, if desired, is normally added to the reaction mixture for the purpose of partially dissolving and deactivating the catalyst and for precipitating the polymer product from solution. After filtration, the solid polymer may be further washed with alcohol and/or acid such as hydrochloric acid, dried, compacted and packaged. Stabilizers such as 2,6 di-t-butyl-p-cresol can be incorporated.

The polymers produced have molecular weights in the range of about 50,000 to 300,000 or even as high as 1,000,000 as determined by the intrinsic viscosity method using the I. Harris Correlation (J. Polymer Science, 8, 361, 1952). The polymers can have a high degree of crystallinity and a low solubility in n-heptane.

In accordance with this invention the polymerization is conducted in a staged operation with the monomer partial pressure being increased as the polymerization proceeds. An initial monomer partial pressure is utilized which is the highest that will give a polymer of desired crystallinity. The monomer partial pressure is then increased under carefully controlled conditions but is kept below the level at which it starts having a detrimental effect on the polymer crystallinity, however. The actual figures on monomer partial pressure are readily determined experimentally and vary with differing catalyst systems and the poisoning effects of various contaminants. The total pressure of the system is in the range of about 15 to 200 p.s.i. with the monomer partial pressure in the range of about 5 to 100 p.s.i., increasing within that range as the reaction proceeds downstream.

This invention is thus applicable to batch, semi-continuous and continuous operation. A convenient semi-continuous operation is obtained when a number of reactors of increasing size are coupled in series with the same catalyst charge used for the consecutive batch polymerizations in each of the reactors. Such an arrangement utilizes the total reactor volume better than what would be the case if only one reactor were used which had to be dimensioned so that it, toward the end of the polymerization, would hold all the polymer formed in a properly diluted slurry. The control of monomer partial pressure is very simple in this case as each reactor is run as if it were part of a batch polymerization.

In a continuous operation the same effect is obtained by controlled addition of the ratio of monomer to diluent to each stage. The monomer may be added either by gaseous injection or by liquid injection as a solution in the diluent added for dilution of the slurry.

This invention will be better understood by reference to the following description, the flow diagram and examples.

In the flow diagram four reactors are shown for convenience and these are coupled in series. The total residence time is four hours with one hour in each reactor with the volumes of the reactor being respectively 1 V., 2 V., 3 V., and 4 V. A catalyst comprising

is slurried in xylene at a concentration of 0.8 g./l. and fed to reactor 5 through line 1 together with gaseous propylene from line 4, which is introduced preferably near the bottom of the liquid. The feed rate is such that the equilibrium monomer concentration in solution at 80° C. is kept below about 1 wt. percent, preferably about 0.2–0.9 wt. percent in xylene by operating at substantially atmospheric pressure. Specifically, with efficient contacting, the monomer concentration is 0.8 wt. percent at 90–95% conversion of the feed at 0 p.s.i.g. At 1 hour residence time, the slurry concentration is 11.3 wt. percent. The slurry is pumped continuously into reactor 10 through line 6 together with fresh xylene diluent from line 7 at the same rate. Propylene is introduced from line 8 at a rate which results in a pressure of 10 p.s.i.g. At this higher pressure, the propylene concentration is sufficiently greater than in reactor 5 to roughly compensate for the normally lower catalyst activity during the second hour. A slurry concentration of 11.4 wt. percent is obtained. Similarly, in the third hour the slurry from line 11 in reactor 20, with monomer line 13 and diluent line 12, has the pressure increased to 25 p.s.i.g. in order to increase monomer concentration sufficiently to maintain a constant polymerization rate in terms of grams of polymer/hour/grams of total catalyst. Thus, the slurry from reactor 20 (11.4 wt. percent polymer) is pumped into reactor 30 through line 14 where the propylene pressure from line 17 is increased to 40 p.s.i.g. during the fourth hour. A final slurry concentration, withdrawn through line 16, of 11.5 wt. percent is obtained, representing an overall catalyst efficiency of 500 g./g. at an average rate of 125 g./hr./g. Without monomer staging, catalyst efficiency is 290 g./g. and the average rate 72 g./hr./g.

Another staged operation can be conducted by introducing the fresh monomers in an inert gas, e.g. propylene in propane into the last reactor. Unused monomer is then introduced at a lower partial pressure into the preceding reactor, etc., but consequently increases with polymerization progress. The monomer thus flows countercurrently to the catalyst and diluent streams. The monomer may be utilized completely without recycling. The presence of a fairly large amount of inert gas also facilitates monomer transfer.

Experiments were carried out in a 2 l. glass batch reactor and in a 3 l. autoclave. The xylene diluent was purified by contacting with $Al_2O_3$ and/or distillation, followed by storage under $N_2$ in the presence of fresh sodium ribbon. High purity propylene was further purified in a series of drying and scrubbing towers, before entering the units. The catalysts were (1) a commercial grade $TiCl_3$, prepared by hydrogen reduction of $TiCl_4$, and (2) an improved laboratory preparation having the composition $TiCl_3 \cdot \frac{1}{3}AlCl_3$, prepared by reduction of $TiCl_4$ with aluminum powder. Both catalysts were activated by grinding under similar conditions and to the same extent prior to use.

EXAMPLE 1

This illustrates the normal, undesirable decrease in activity with time which takes place with all catalysts studied (Runs A and B). Run C shows that an even more rapid deactivtaion rate occurs when a higher initial monomer concentration is used. It has been shown that this loss of activity is not due to catalyst poisoning, but the exact mechanism is not known.

*Catalyst Activity Decreases With Time*

| Run | A | B | C |
|---|---|---|---|
| Catalyst | $TiCl_3 \cdot \frac{1}{3}AlCl_3$ | | $TiCl_3$ |
| grams | 0.61 | 0.24 | 0.35 |
| AlEt$_3$/Ti Ratio | 2.0 | 2.0 | 2.0 |
| Polymerization: | | | |
| Xylene Diluent, l | 0.5 | ᵃ 0.5 | 2.0 |
| Catalyst Conc., g./l | 3.0 | 1.0 | 0.43 |
| Temperature, °C | 80 | 80 | 80 |
| Time, Hrs | 4 | 12 | 3 |
| C$_3$H$_6$ Conc., wt. percent | ᵇ 1 | ᵇ 1 | 3.6 |
| Rate, g./hr./g.: | | | |
| 1st hour | 17.7 | 103 | 250 |
| 2nd hour | 13.0 | 76 | 131 |
| 3d hour | 10.5 | 62 | 50 |
| 4th hour | 8.9 | 48 | |
| 8th hour | | 27 | |
| 12th hour | | 16 | |
| Average, first 3 hrs | 13.7 | 81 | 143 |
| Polymer Properties: | | | |
| Density | 0.902 | 0.899 | 0.897 |
| Tensil, p.s.i | 5,200 | 4,500 | 4,010 |
| Intrinsic Viscosity | 2.86 | 2.59 | 3.23 |

ᵃ Xylene was added throughout the run to maintain about 10 wt. percent slurry concentration for operability.
ᵇ Atmospheric pressure.

EXAMPLE 2

Runs D to H show that polymer crystallinity decreases with increasing initial monomer concentration. Thus, this manner of increasing activity clearly results in a very undesirable loss of polymer crystallinity as measured by polymer density and tensile strength (compare D and E; also F, G. and H).

*Polymer Crystallinity Decreases With Increased Monomer Concentration* ᵃ

| Run | D | E | F | G | H |
|---|---|---|---|---|---|
| Catalyst | $TiCl_3$ | | $TiCl_3 \cdot \frac{1}{3}AlCl_3$ | | |
| grams | 0.37 | 0.37 | 0.465 | 0.35 | 0.395 |
| AlEt$_3$/Ti Ratio | 2 | 2 | 2 | 2 | 2 |
| Polymerization: | | | | | |
| Xylene Diluent, l | 1.0 | 1.0 | 1.0 | 2.0 | 2.0 |
| Cat. Conc., g./l | 0.92 | 0.92 | 1.0 | 0.43 | 0.42 |
| Temperature, °C | 82 | 82 | 80 | 80 | 80 |
| Time, Min | 75 | 70 | 60 | 180 | 60 |
| C$_3$H$_6$, wt. percent on Diluent | 3 | 6 | 1 | 3.6 | 5.0 |
| Rate, g./hr./g | 62 | 128 | 108 | 143 | 288 |
| Polymer Properties: | | | | | |
| Density | 0.899 | 0.894 | 0.900 | 0.897 | 0.895 |
| Tensil, p.s.i | 4,500 | 3,300 | 4,800 | 4,010 | 3,500 |
| Intrinsic Viscosity | 2.44 | 1.94 | 2.5 | 3.23 | 3.55 |

ᵃ In bomb experiments, initial monomer concentration up to 90 wt. percent have given even greater losses in polymer crystallinity often together with severe reactor fouling.
ᵇ Atmospheric pressure. Gaseous propylene was bubbled through the liquid phase.

EXAMPLE 3

As a demonstration of this invention, monomer concentration was increased in stages in order to maintain a high polymerization rate in the later stages of the run. Under the conditions described, the polymerization rate actually increased somewhat with time. Surprisingly, polymer crystallinity, as measured by density and tensile strength, was not harmed by the higher monomer concentrations in the second and third stages and in fact was comparable to that of Run F made at atmospheric pressure and consequently it was much improved over Runs G and H where higher monomer concentrations were employed throughout the polymerization reactions.

*Staged Monomer Concentration Maintains Rate and Polymer Crystallinity*

| Run | I | | | |
|---|---|---|---|---|
| Catalyst | $TiCl_3 \cdot \frac{1}{3}AlCl_3$ | | | |
| grams | 0.32 | | | |
| AlEt$_3$/Ti Ratio | 2.0 | | | |
| | 1st Hour | 2nd Hour | 3rd Hour | Total |
| Polymerization: | | | | |
| Xylene | 1.0 | 2.0 | 3.0 | |
| Catalyst Conc., g./l | 0.8 | 0.4 | 0.26 | |
| Temperature, °C | 80 | 80 | 80 | |
| C$_3$H$_6$ Conc. Estimated wt. percent | 0.8 | 1.4 | 2.4 | |
| Rate, g./hr./g | 105 | 120 | 125 | 117 |
| Polymer Properties: | | | | |
| Density | | | | 0.900 |
| Tensile, p.s.i | | | | 4,700 |
| Intrinsic Viscosity | | | | 2.70 |

The operation of this invention is applicable to higher alpha olefins and branched olefins, such as 3-methyl butene-1, 4-methyl pentene-1 and 4,4-dimethyl hexene-1, in which no one branch is closer than carbon three and no double branch is closer than carbon four in relation to the double bond.

The staged process described herein is ideally suited to be combined with small amounts of hydrogen injection to obtain simultaneous control of molecular weight and desired polymer crystallinities as well as catalyst activity. Since molecular weight tends to increase with increasing monomer concentration, the amount of hydrogen can be adjusted in each stage, if desired, to vary both the molecular weight and the molecular weight distribution. For example, at 2.6% propylene concentration the addition of 200 p.p.m. $H_2$ decreases polymer intrinsic viscosity from about 3.2 to 1.7.

The advantages of this invention will be apparent to those skilled in the art. Improved crystallinity of product and activity of catalyst are obtained in an economical, easily controlled manner. The process is flexible and can be adapted to fit different circumstances.

It is to be understood that this invention is not limited to the specific examples which have been offered merely as illustrations and that modifications may be made without departing from the spirit of the invention.

What is claimed is:

1. In a staged polymerization of an alpha olefin monomer having more than 2 carbon atoms with a catalyst system formed by admixing an aluminum alkyl with a partially reduced titanium halide containing aluminum halide cocrystallized therewith at a temperature in the range of 0–100° C. and a total pressure in the range of 15 to 200 p.s.i., the improvement which comprises adjusting monomer concentration so as to have a monomer partial pressure of between about 5 and 100 p.s.i., and thereafter increasing the monomer partial pressure within the range of 5 to 100 p.s.i. as the polymerization proceeds without substantial reduction of total pressure by addition of fresh monomer whereby both improved polymer product crystallinity and catalyst activity are obtained.

2. The process of claim 1 in which the stages are in series with polymer product-catalyst slurry being moved concurrently continuously from the initial stage through the successive stages.

3. The process of claim 2 in which the stages are of increasing volume.

4. The process of claim 1 in which the titanium halide is a titanium chloride and the aluminum alkyl is aluminum triethyl.

5. The process of claim 1 in which the stages are in series and the monomer flow is countercurrent to the catalyst flow, the monomer partial pressure decreasing as it passes to successive stages but increasing with polymerization progress.

References Cited in the file of this patent

UNITED STATES PATENTS

| | | |
|---|---|---|
| 2,827,447 | Nowlin et al. | Mar. 18, 1958 |
| 2,889,314 | Fritz | June 2, 1959 |